United States Patent [19]

Johnson et al.

[11] Patent Number: 4,641,750
[45] Date of Patent: Feb. 10, 1987

[54] TWO-PLY CASSETTE ALBUM AND METHOD OF MAKING SAME

[75] Inventors: Breck J. Johnson, Prior Lake; George D. Canfield, Chaska, both of Minn.

[73] Assignee: Blackbourn, Inc., Eden Prairie, Minn.

[21] Appl. No.: 787,527

[22] Filed: Oct. 15, 1985

[51] Int. Cl.[4] .................... B65D 85/672; B31B 1/64; B32B 31/20
[52] U.S. Cl. .................................. 206/387; 206/472; 493/84; 493/901; 493/133; 156/290
[58] Field of Search ............... 206/387, 444, 472; 493/84, 85, 901, 902, 133; 156/308.4, 290

[56] References Cited

U.S. PATENT DOCUMENTS

| | | | |
|---|---|---|---|
| 2,767,756 | 10/1956 | Niles | 156/290 |
| 2,788,041 | 4/1957 | Carver. | |
| 3,215,450 | 11/1965 | Peterson. | |
| 3,315,718 | 4/1967 | Berman. | |
| 3,317,955 | 5/1967 | Schurman et al. | 264/524 |
| 3,442,371 | 5/1969 | Deshong et al. | 206/45.23 |
| 3,640,379 | 2/1972 | Weingarden. | |
| 3,743,081 | 7/1973 | Roberg et al. | 206/387 |
| 3,902,598 | 9/1975 | Koob. | |
| 4,341,307 | 7/1982 | Shyers | 206/387 |
| 4,407,410 | 10/1983 | Graetz | 206/387 |
| 4,432,827 | 2/1984 | Graetz | 206/387 |
| 4,496,048 | 1/1985 | Sykes. | |
| 4,501,361 | 2/1985 | Rose, Jr. | 206/387 |
| 4,518,275 | 5/1985 | Rauch, III et al. | 206/387 |
| 4,555,290 | 11/1985 | Graetz. | |

FOREIGN PATENT DOCUMENTS

| | | | |
|---|---|---|---|
| 2503667 | 10/1982 | France. | |
| 593651 | 6/1975 | Switzerland | 220/337 |
| 2101970 | 1/1983 | United Kingdom | 206/387 |

Primary Examiner—William Price
Assistant Examiner—Brenda J. Ehrhardt
Attorney, Agent, or Firm—Merchant, Gould, Smith, Edell, Welter and Schmidt

[57] ABSTRACT

A two-ply, book-style album (10) comprises an inside tray sheet (12) and an outside cover sheet (14). Sheets (12 and 14) are preferably formed of high-density polyethylene, and are thermally heat-sealed together by means of a peripheral seal (34) and spine rules (36). The spine rules (36) include longitudinal grooves (38) formed to a substantial depth into the front surface of the inside tray sheet (12) in order to define living hinges which provide a roundish, less square spine of more pleasing appearance.

12 Claims, 9 Drawing Figures

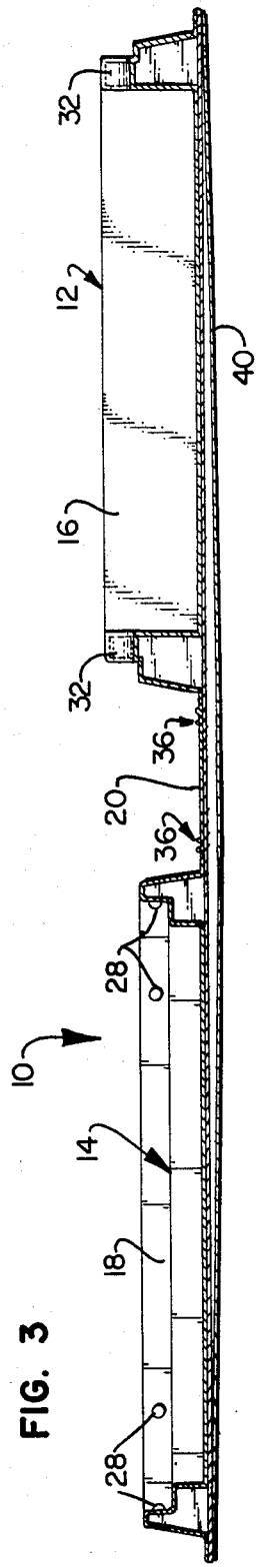
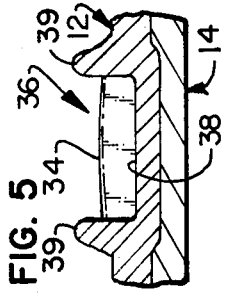
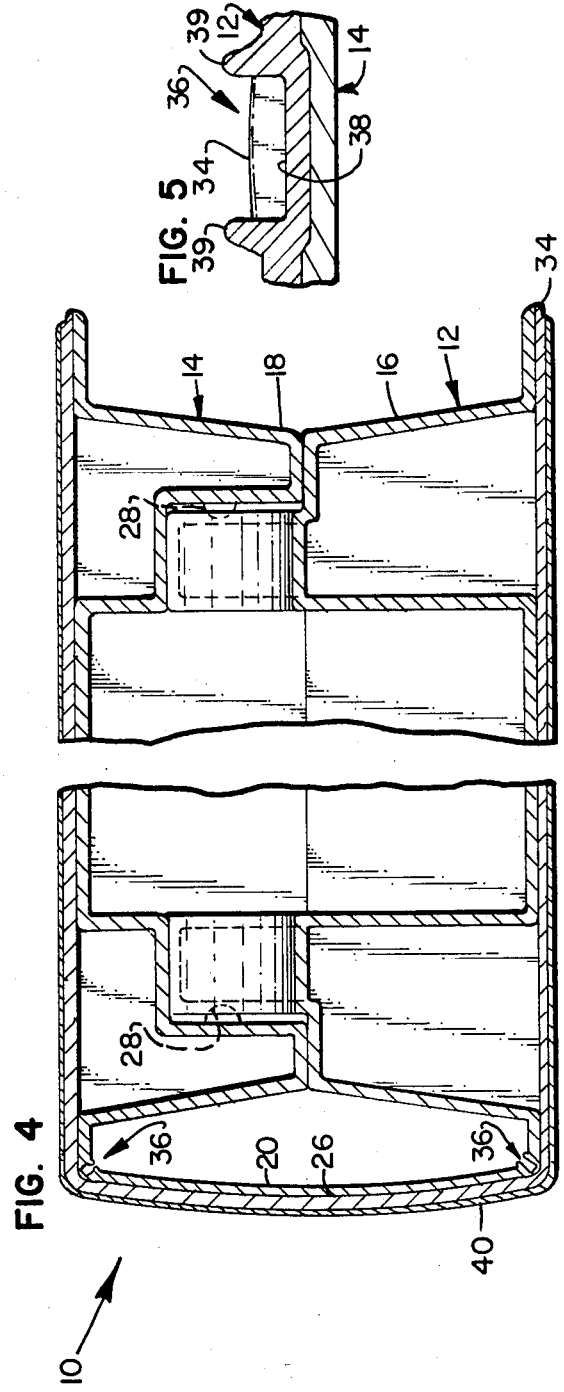
FIG. 3
FIG. 5
FIG. 4

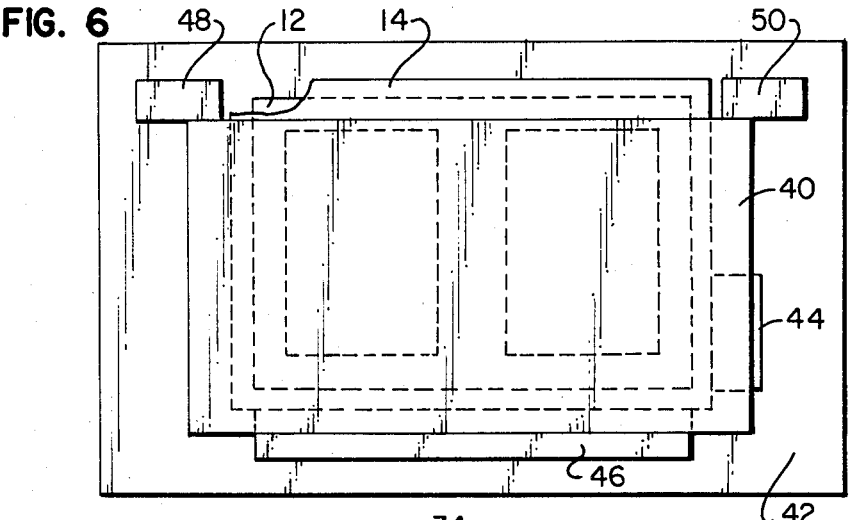
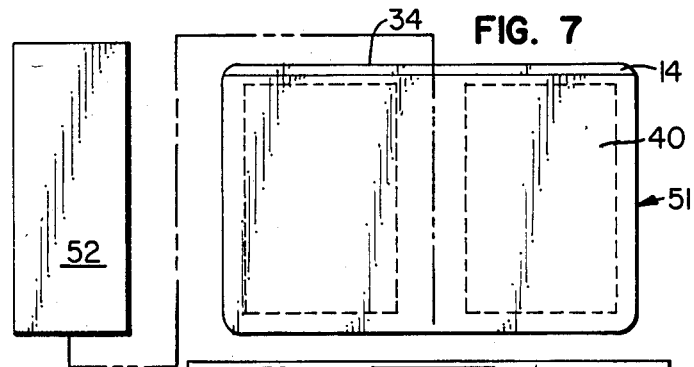
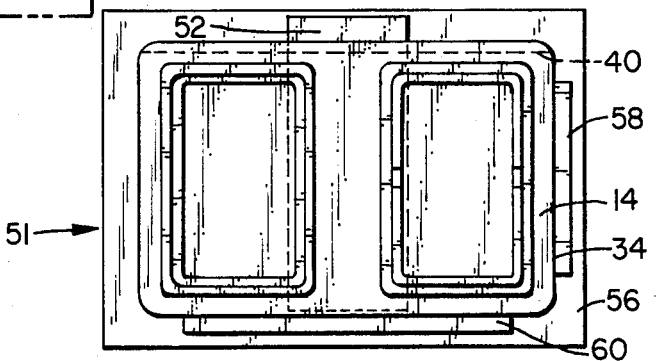
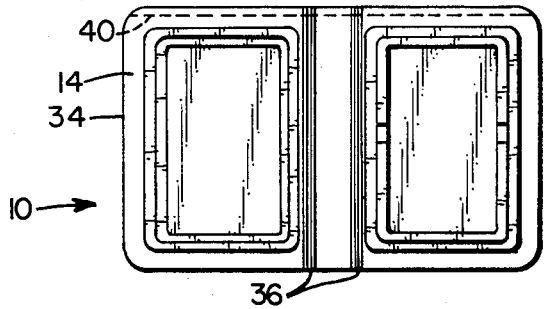

TWO-PLY CASSETTE ALBUM AND METHOD OF MAKING SAME

TECHNICAL FIELD

The present invention relates generally to a vacuum-formed, thermally, heated-sealed container for video cassettes and the like. More particularly, this invention concerns a unique two-ply album of improved construction utilizing fewer pieces to achieve greater production economies.

BACKGROUND ART

Book-like containers or albums have been widely utilized for packaging cassettes and other types of media materials. Such albums are of three-ply construction generally consisting of a stiff inside pair of trays of polyvinyl chloride (PVC), a flexible vinyl hinge strip interconnecting the trays, an outer cover of flexible vinyl, and rigid inserts of cardboard or chipboard between the cover and trays for rigidity.

It has been common practice to manufacture such vinyl albums by first laying the separate trays upside down in a nesting fixture, followed by positioning the hinge strips over the adjacent edges of the trays. Rigid inserts of cardboard or the like are then positioned over the trays and hinge strips, followed by a cover sheet. Any "trap-in" or clear vinyl overlay defining a pocket for a book jacket or the like, is then laid over the cover, after which the sealing die is actuated to seal the edges of the trays, hinge strips, cover and any trap-in sheet by RF electricity to secure the album. The completed albums are then removed from the fixture and inspected, and any excess material is stripped from the periphery of the albums before shipment to the customer for packing and resale as a packaged product.

Such albums have been available from Blackbourn, Inc., the assignee of the present invention, and others for years. This construction technique results in albums of high quality but somewhat higher unit cost. The relatively high unit cost has been due primarily to the extra time and labor involved in properly positioning and laying up the various pieces in the nesting fixture. In addition, since overlying edge portions of the trays, hinge strip, and cover were sealed together to form a spine rules, it has been necessary to slip an extra piece of insulating material between any trap-in and the hinge area of the cover to avoid sealing of the trap-in to the cover on the spine in order to provide a "full open" trap-in extending between the covers across the back of the album. This of course requires further time and labor, which can be significant in the manufacture of relatively low cost, high volume products.

In 1980, Blackbourn produced and offered the "EconoPak" album in response to the need for a lower cost RF heat-sealed album of the same or similar quality. Instead of separate trays and a separate vinyl hinge strip between the trays, the Econo-Pak album incorporated a one-piece stiff molded sheet defining the trays and an integral spine liner portion therebetween, together with cardboard inserts between the trays and cover but not between the spine liner portion of the inner tray sheet and the spine portion of the outer cover sheet, but was otherwise constructed as before.

More recently, U.S. Pat. Nos. 4,407,410 and 4,432,827 have issued for a book-type cassette holder and method of making same. These patents show an RF heat-sealed album which is identical to the prior Blackbourn EconoPak, except for omission of the seals on the spine so that the integral spine liner portion between the trays and the spine portion on the cover can flex outwardly across their entire widths. Since this construction does not incorporate any seals or spine rules on the spine, it facilitates provision of a full open trap-in because there is no need to insulate the trap-in from any sealing along the spine. This construction has certain efficiencies over the albums with separate trays and vinyl hinging strips of the prior art. However, proper positioning and lay-up of the various components, which are done primarily manually, are still required and thus limit the efficiencies obtainable by this technique.

It will be appreciated that there is an increasing demand for prerecorded video cassettes and other products. There is thus a need for an improved video cassette album whose construction offers substantial manufacturing efficiencies over the prior art.

SUMMARY OF INVENTION

The present invention comprises an improved video cassette album and method of manufacture thereof which overcomes the foregoing and other difficulties associated with the prior art. In accordance with the invention, there is provided a two-ply video cassette album comprising a cover sheet of semi-rigid thermoplastic sheet material and a tray sheet of molded semi-rigid thermoplastic sheet material defining a pair of inter-fitting complementary trays interconnected by an integral spine liner portion. The outer cover sheet and inner tray sheet are each of one-piece construction, and are preferably formed of high-density polyethylene to eliminate the need for intermediate cardboard inserts for rigidity. After the inside and outside sheets are laid up in a nesting fixture, the sealing die is actuated to thermal heat-seal the outside peripheries of the sheets as well as opposite sides of the spine extending between the top and bottom edges of the sheets. The album is sealed on the spine from the inside by means of heated spine rules so as to form grooves or areas of reduced thickness in the inside sheet which function as "living hinges" without disfiguring the outer sheet so that the album can flex across substantially the entire width of its spine without the stress concentrations associated with conventional spine rules. If desired, a cover sheet of thermoplastic material, preferably low-density polyethylene, can be provided over the cover sheet for sealing about three sides thereof to form a "trap-in" pocket.

BRIEF DESCRIPTION OF DRAWINGS

A better understanding of the invention can be had by reference to the following Detailed Description in conjunction with the accompanying Drawings, wherein:

FIG. 3 is a cross-sectional view taken along lines 3—3 of FIG. 2 in the direction of the arrows;

FIG. 4 is an enlarged cross-sectional view taken along lines 4—4 of FIG. 1 in the direction of the arrows;

FIG. 5 is an enlarged cross-sectional illustration of an inside spine rule of the album; and FIGS. 6–9 illustrate the method of manufacturing the video cassette album of the invention.

DETAILED DESCRIPTION

Figure 1:
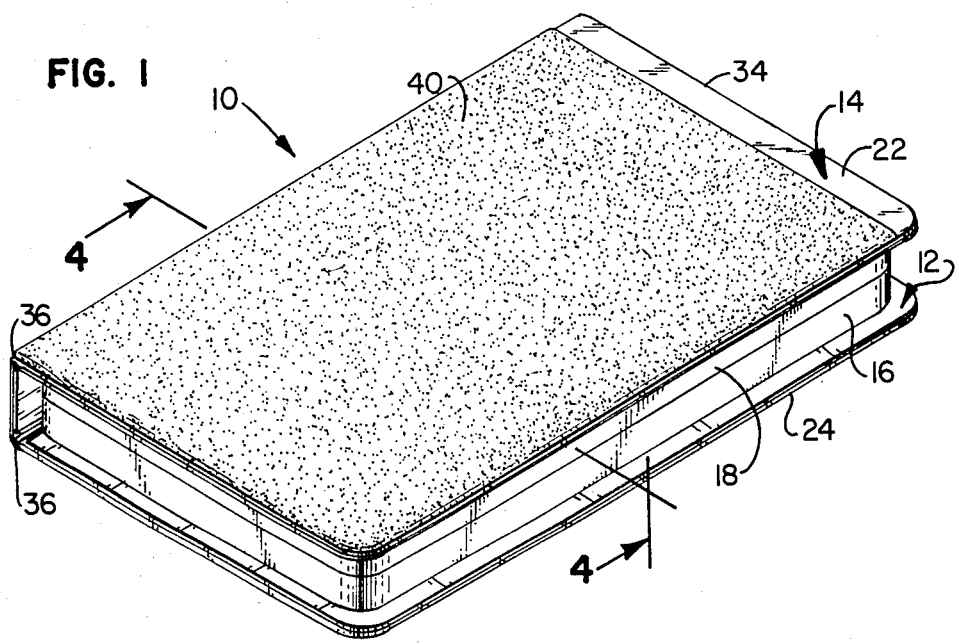
FIG. 1 is a perspective view of the video cassette album of the invention, in closed position.
Figure 2:
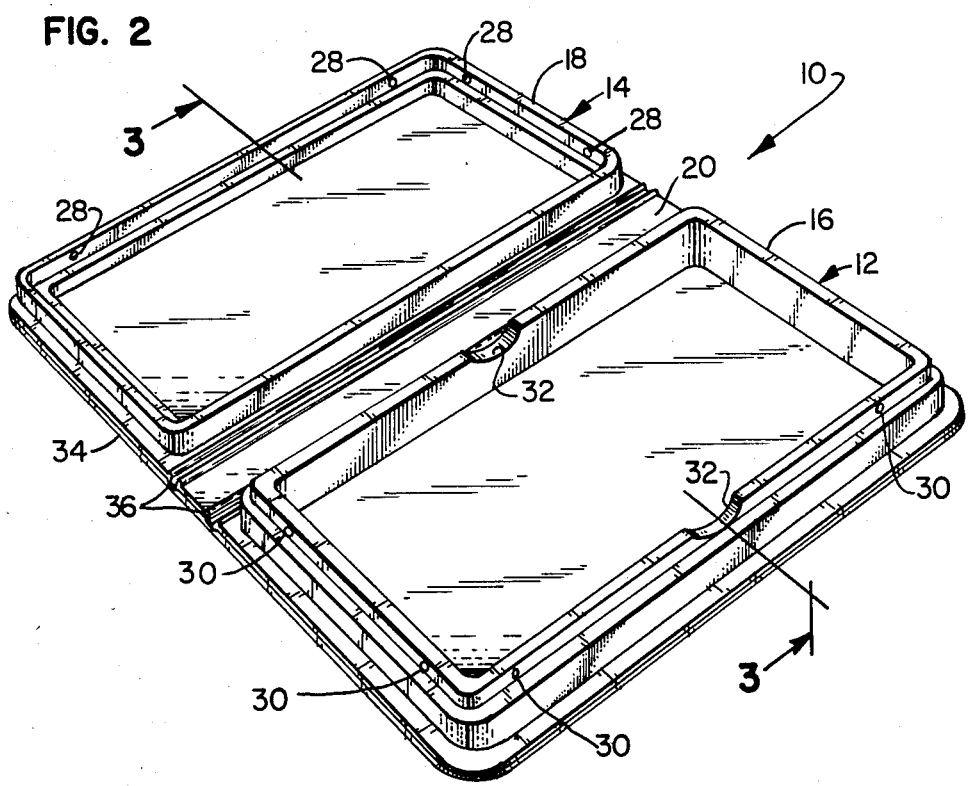
FIG. 2 is a perspective view of the video cassette album in open position and without a cassette therein.

Referring now to the Drawings, wherein like reference numerals designate like or corresponding elements throughout the views, and particularly referring to FIGS. 1-5, there is shown the two-ply video cassette album 10 of the invention. As will be explained more fully hereinafter, the album 10 is of improved, simplified two-ply construction in order to achieve better manufacturing economies over the prior art in an industry where the products are characterized by high production volume and low unit cost.

The album 10 comprises two sheets 12 and 14 of suitable thermoplastic material secured about their peripheries. The inner sheet 12 defines a pair of interfitting trays 16 and 18 and connecting spine portion 20. Trays 16 and 18 can be formed in the inner sheet 12 by means of a conventional vacuum-forming technique. The trays 16 and 18 form a cavity for a video cassette (not shown) when closed in stacked relationship as illustrated in FIG. 4. Trays 16 and 18 include inner and outer peripheral walls joined by a top wall defining complementary male/female portions that form a dust seal when closed.

The outer sheet 14 defines a pair of covers 22 and 24 and connecting spine portion 26. Each sheet 12 and 14 is of one-piece, integral construction.

In accordance with the preferred embodiment, the sheets 12 and 14 are each formed of semi-rigid thermoplastic material, such as twenty-gauge high-density polyethylene. The use of semi-rigid thermoplastic material in both sheets 12 and 14 is preferable because it provides sufficient rigidity without cardboard inserts between the sheets. Album 10 utilizes no rigid cardboard inserts between sheets 12 and 14 and was specifically designed to have the necessary rigidity and structural integrity without such inserts, while also being easy to open and close.

Raised bumps 28 are provided about the inside upper edge of tray 18, and complementary corresponding recesses 30 are provided about the outside upper edge of tray 16 to form a releasable detent-type locking means for securing the album 10 in closed position. As illustrated, two raised bumps 28 and complementary recesses 30 are provided on each side of the trays 16 and 18. In addition, a pair of finger recesses 32 are provided in opposite lateral sides of the upper edge of tray 16 to facilitate gripping and removal of a video cassette therefrom.

Sheets 12 and 14 are secured together by means of a peripheral seal 34 extending completely around the peripheries of the sheets, and a pair of spine rules 36 extending between the upper and lower edges of the sheets. The peripheral seal 34 is preferably formed by means of a thermally-heated sealing die which simultaneously cuts and seals the edges of the sheets by direct thermal contact at about 385°-405° F. The spine rules 36 are also formed by means of a thermally-heated sealing die, in the form of two laterally spaced-apart thermally-heated rules, which form narrow depressions or longitudinal notches into sheet 12 from the inside. As is best seen in FIG. 5, each spine rule 36 comprises a narrow groove or recess 38 and raised border 40 extending between the peripheral seal 34 on opposite top and bottom sides of the album 10.

The particular configuration of the spine rule 36 comprises a significant feature of the present invention. In contrast to the prior art, which utilized spine ruling that formed relatively wider areas of reduced thickness in both sheets, the spine rules of album 10 are relatively narrow and extend into the front surface of the inside tray sheet 12 to a depth of at least half the thickness of the inside sheet. As used herein, the terms "front" or "inside" surface of sheet 12 means that surface of side facing up in FIG. 2. The recess can be about 0.125 inch wide and about 0.010 inch deep in the case of twenty-gauge material for sheet 12, as shown, and some slight compression of sheet 14 can result. However, it will be understood that the recess 38 could be extended completely through the inner tray sheet 12 and possibly partially into the adjacent cover sheet 14, if desired. This results in "living hinges" which facilitate opening and closing of album 10 in book-like fashion, without marking of the outside cover 14 in order to provide a less square spine (when album 10 is closed) of smooth, pleasing appearance. In the prior art, the spine ruling forms relatively wider areas of reduced thickness in the inside and outside sheets, as well as in any intermediate hinge strip, to form living hinges which are apparent from either side and which are also points of stress concentration that can lead to cracking. The present invention overcomes those problems by forming narrow spine rules 36 primarily into the inside sheet 12 so that the sheets 12 and 14 are sealed together over two narrow areas, not evident from the outside, which serve as living hinges but also enable the two spine portions 20 and 26 to flex over a wider area for better stress distribution, less susceptibility to cracking, as well as a more pleasing appearance of less squarish shape.

If desired, an overlay sheet 40 can be provided about the outside sheet 14 for purposes of defining a "trap-in" pocket to receive a jacket, label or the like for purposes of identification. The overlay sheet 40, which is preferably formed of suitable thermoplastic material such as six-gauge low-density polyethylene, is sealed about only three edges so that the top edge is free to receive a label.

FIGS. 6-9 illustrate the method by which album 10 is manufactured. The album 10 can be manufactured four-up or eight-up, which is to say four or eight albums at a time, depending upon the particular nesting fixture and die equipment utilized. However, for purposes of illustration, we have shown the manufacture of a single album 10. The inner sheet 12 defining trays 16 and 18 and spine portion 20 is pre-formed by vacuum molding in conventional fashion. The uncut, pre-formed inner tray sheet 12 is then placed upside down into a nesting fixture 42 having appropriate recesses therein for receiving the trays 16 and 18 so that the reverse or back side of sheet 12 is facing upward. The raised wall portions of trays 16 and 18 extend into recessed position in the die 42, while the other portions of the tray sheet 12 are supported horizontally in fixture 42.

Following placement of the tray sheet 12 in upside down position in the nesting fixture 42, the outer cover sheet 14 is then laid over the back side of the tray sheet. Locating pins or blocks 44 and 46 are provided on the fixture 42 for positioning the cover sheet 14 in proper overlying relationship with the tray sheet 14.

Following placement of the cover sheet 14 over the back of the tray sheet 12, the optional overlay sheet 40 can then be placed over the cover sheet, if desired. Locating pins or blocks 48 and 50 are also provided for locating the overlay sheet 40, and particularly the upper edge thereof, in proper position relative to the underlying cover sheet 14 and tray sheet 12.

After the sheets 12, 14 and 40 have been laid up in this fashion, the overlying die (not shown) is actuated to bring it down into engagement with the fixture 42 in order to simultaneously cut the sheets and provide a peripheral seal 34, by thermal heating, resulting in a semi-complete album 51. FIG. 7 illustrates the back of the semi-complete album 51 after the first die hit when the peripheral seal 34 is formed, but before the second die hit when the spine rules 36 are formed. If the album 51 includes an overlay sheet 40, an insulating sheet 52 must be placed between sheets 40 and 14 before the second die hit.

FIG. 8 shows the album 51, right side up, in position on another die 54 for the second die hit. Again, locating pins or blocks 56 and 58 are provided on the die 54 for properly locating the semi-finished album 51 relative to the top die portion (not shown).

FIG. 9 shows the finished album 10 with spine rules 36 after the second die hit and removal of the insulating sheet 52.

From the foregoing, it will thus be apparent that the present invention comprises a two-ply cassette album having numerous advantages over the prior art. One advantage involves the fact that the album herein is of two-ply construction throughout and is of sufficient rigidity and structural integrity without utilizing any inserts between the tray and cover sheets. Another advantage involves the specialized spine rules formed in the front surface of the inner tray sheet to serve as living hinges that provide a less squarish and thus more pleasing appearance when the album is closed, without marring the outside cover sheet. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

What is claimed is:

1. A two-ply, book-style album for holding video cassettes and the like, comprising:

a one-piece, integral inside sheet of semi-rigid thermoplastic having front and back sides, said inside sheet defining a pair of raised integral interfitting tray portions and an integral spine portion connecting the tray portions;

a one-piece, integral outside sheet of semi-rigid thermoplastic having front and back sides, said outside sheet defining a pair of integral cover portions and an integral spine portion connecting the cover portions; a peripheral seal securing said inside and outside sheets together; and a pair of laterally spaced-apart, longitudinal seals securing adjacent spine portions of said inside and outside sheets, each longitudinal seal including a groove formed by contact with a thermally-heated rule to a substantial depth into the front side of the spine portion of the inside sheet so as to define living hinges in the inside sheet and a smooth surface on the backside of the outside sheet to facilitate opening and closing the album.

2. The album of claim 1, wherein said inside sheet is formed of high-density polyethylene.

3. The album of claim 1, wherein said outside sheet is formed of high-density polyethylene.

4. The album of claim 1, further including an overlay sheet partially peripherally secured over said outside sheet to define a trap-in pocket for receiving a label or the like.

5. The album according to claim 4, wherein said overlay sheet is formed of low-density polyethylene.

6. The album of claim 1, further including complementary bumps and recesses formed in corresponding portions of the interfitting trays of said inside sheet to define detents for releasably securing the album in closed position.

7. A two-ply, book-style album for holding video cassettes and the like, comprising:

a one-piece, integral inside sheet having front and back sides, said inside sheet defining a pair of raised integral interfitting tray portions and an integral spine portion connecting the tray portions;

a one-piece, integral outside sheet having front and back sides, said outside sheet defining a pair of integral cover portions and an integral spine portion connecting the cover portions;

said inside and outside sheets being formed of high-density polyethylene of about equal thickness;

a peripheral seal securing said inside and outside sheets together; and a pair of laterally spaced-apart, longitudinal seals securing adjacent spine portions of said inside and outside sheets, each longitudinal seal including a groove formed by contact with a thermally-heated rule into the front side of the spine portion of the inside sheet to a predetermined depth at least half the thickness of said inside sheet so as to define living hinges in the inside sheet and a smooth surface on the backside of the outside sheet to facilitate opening and closing the album.

8. A method of manufacturing a two-ply, book-style album for holding video cassettes and the like, comprising the steps of:

providing a preformed, one-piece first sheet of semi-rigid thermoplastic defining a pair of spaced-apart integral raised interfitting tray portions connected by an integral spine portion;

providing a second sheet of semi-rigid thermoplastic defining a pair of laterally spaced-apart cover portions interconnected by an integral spine portion;

positioning the front of the second sheet over the back of the first sheet;

contacting the peripheries of the first and second sheets with a thermally-heated die to effect trimming and sealing; and contacting only the front of the spine portion of the first sheet over a pair of longitudinal, laterally spaced-apart relatively narrow areas with thermally-heated rules to a predetermined depth of at least half the thickness of the first sheet without marring the back of the second sheet to seal adjacent spine portions of the sheets and define living hinges that facilitate opening and closing the album.

9. The album manufactured according to the method of claim 8.

10. The method of claim 8, wherein said first sheet is formed of high-density polyethylene.

11. The method of claim 8, wherein said second sheet is formed of high-density polyethylene.

12. The method of claim 8, wherein said first and second sheets are both formed of high-density polyethylene.

* * * * *